US009884785B2

(12) United States Patent
Liguori

(10) Patent No.: US 9,884,785 B2
(45) Date of Patent: Feb. 6, 2018

(54) PERVIOUS CONCRETE HAVING A SUPER-ABSORBENT POLYMER

(71) Applicant: David Nat Liguori, San Carlos, CA (US)

(72) Inventor: David Nat Liguori, San Carlos, CA (US)

(*) Notice: Subject to any disclaimer, the term of this patent is extended or adjusted under 35 U.S.C. 154(b) by 0 days.

(21) Appl. No.: 15/293,150

(22) Filed: Oct. 13, 2016

(65) Prior Publication Data

US 2017/0275201 A1  Sep. 28, 2017

Related U.S. Application Data

(60) Provisional application No. 62/313,705, filed on Mar. 25, 2016.

(51) Int. Cl.
*C04B 24/00* (2006.01)
*C04B 24/26* (2006.01)
*C04B 28/02* (2006.01)
*C04B 28/08* (2006.01)
*C04B 103/00* (2006.01)
*C04B 103/46* (2006.01)

(52) U.S. Cl.
CPC ........ *C04B 24/2641* (2013.01); *C04B 28/021* (2013.01); *C04B 28/08* (2013.01); *C04B 2103/0051* (2013.01); *C04B 2103/465* (2013.01)

(58) Field of Classification Search
CPC .................................................. C04B 24/2641
See application file for complete search history.

(56) References Cited

U.S. PATENT DOCUMENTS

2002/0055558 A1* 5/2002 Maehara ................. C09K 3/18
524/4
2010/0285224 A1* 11/2010 Fisher ................ C04B 40/0039
427/343

OTHER PUBLICATIONS

Excerpt from "Permeable Pavements", Chapter 3, pp. 88-89, Eisenberg, Lindow, Smith, Eds., ASCE, (2015).

(Continued)

*Primary Examiner* — Lanee Reuther
(74) *Attorney, Agent, or Firm* — McDermott Will & Emery LLP; Richard G. A. Bone

(57) ABSTRACT

A pervious concrete composition comprising a superabsorbent polymer, thereby enabling a water/cement ratio of 0.35-0.50. The superabsorbent polymer can be a cross-linked sodium polyacrylate-acrylamide/acrylic acid copolymer. The invention further comprises methods of installing the pervious concrete compositions.

3 Claims, 2 Drawing Sheets

(56) References Cited

OTHER PUBLICATIONS

"Reducing Curing Requirements for Pervious Concrete with a Superabsorbent Polymer for Internal Curing", Kevern and Famey, Transportation Research Record; Journal of the Transportation Research Board, No. 2290, Transportation Research Board of the National Academies, Washington, D.C., pp. 115-121, (2012).
"Application of Superabsorbent Polymers (SAP) in Concrete Construction", V. Mechtcherine, and H.-W. Reinhardt. Eds., Springer, at pp. 88, 92, and 114, (2011).
http://www.lurascreed.com/previous, web-page for Lura Enterprises, Inc. (last accessed, Apr. 10, 2016) (Replacement copy for item originally filed on IDS dated Jan. 11, 2017).
Sigma-Aldrich Chemical Company, entry for material having identifier CAS #9003-04-7 http://www.sigmaaldrich.com/catalog/search?interface=All&term=9003-04-7&interface=CAS No.&N=0&mode=matchpartialmax&lang=en&region=US&focus=product Last accessed Mar. 23, 2017.
Sigma-Aldrich Chemical Company, entry for material having identifier CAS #9033-79-8 http://www.sigmaaldrich.com/catalog/search?term=9033-79-8&interface=CAS%20No.&N=0+&mode=mode%20matchpartialmax&lang=en&region=US&focus=product Last accessed Mar. 23, 2017.

\* cited by examiner

PERVIOUS CONCRETE HAVING A SUPER-ABSORBENT POLYMER

CLAIM OF PRIORITY

This application claims the benefit of priority under 35 U.S.C. §119(e) to U.S. provisional application Ser. No. 62/313,705, filed Mar. 25, 2016, which is incorporated herein by reference in its entirety.

TECHNICAL FIELD

The invention generally relates to pervious concrete compositions, and more particularly relates to such compositions that contain a superabsorbent polymer.

BACKGROUND

Pervious concrete is gaining importance in landscaping and construction applications where reducing run-off and preventing depletion of groundwater supplies are important.

In pervious concrete, carefully controlled amounts of water and cementitious materials are used to create a paste that forms a thick coating around aggregate particles. Unlike regular concrete, however, a pervious concrete mixture contains little or no sand, which results in a substantial void content. Using a carefully controlled quantity of cement paste to coat and bind the aggregate particles together, a system of interconnected voids is created. These interconnected voids create a highly permeable product that allows rain water to pass through quickly. Typically, between 15% and 25% voids by unit volume are achieved in the hardened pervious concrete. Flow rates for water through pervious concrete typically range from 500 to 1,500"/hr. Both the low mortar content and the high porosity also reduce strength compared to regular concrete mixtures, but sufficient strength for many applications can still be readily achieved.

In essence, all concrete is comprised of aggregate such as sand and stones of varying coarseness, cement and water. Pervious concrete (PC), which contains intentionally created interconnected voids throughout its bulk, is also comprised of aggregate, cement and water, but in a unique manner that differentiates it from other concretes.

The ranges of the various components of regular and pervious concrete known in the art are shown in Table 1, where weights are expressed in units per cubic yard of material, and w/c is the water:cement ratio.

TABLE 1

|  | w/c | Sand (lbs) | coarse aggregate (lbs) | cement (lbs) | hydration stabilizer (oz.) |
| --- | --- | --- | --- | --- | --- |
| regular | 0.45-0.60 | 1,250-1,800 | 1,250-1,800 | 560-700 | 0 |
| pervious | 0.25-0.40 | 0-100 | 2,500-2,800 | 400-550 | 16-40 |

The aggregate in all forms of concrete is suspended in a solution of cement "paste", which is the combination of water and cement. In "regular" concrete, the particles of aggregate may, but typically do not, make contact with each other, while cement paste completely fills in the regions between the particles of aggregate. In order for the cement paste to effectively fill in the spaces, its viscosity needs to be low enough (i.e., the paste is thin enough) to allow it to flow easily around the individual pieces of aggregate.

When water and cement are mixed together in the right proportions they make a strong, durable, hardened paste. Cement molecules undergo a hydration reaction with water, which results in the growth of calcium silicate hydroxide ("CSH") crystals that give concrete its strength. If the water/cement ratio is too low, there will not be enough water to fully hydrate the cement, resulting in a weak concrete. If the water/cement ratio is too high, the cement will fully hydrate but the additional volume of water will have spaced the cement molecules father apart, preventing the growing CSH crystals from creating strong bonds with each other.

The general consensus in the scientific community is that the ideal proportion, known as the water/cement (w/c) ratio, for optimum hydration conditions of all concretes is in the range of 0.41-0.43 by weight of the mix, see FIG. 2 (data from Meininger, *Concrete International*, Vol. 10:8, p. 22 (1988)). Water/cement ratios are typically quoted in the mix, before pouring, curing and setting. W/c ratios in regular concrete however are typically quite a bit higher than the ideal, very often in the range 0.55-0.65, for reasons relating to workability. It is well understood within the engineering and construction fields that, while higher w/c ratios do have a negative impact on concrete strength and performance, the trade-off is none the less important to make the concrete workable in the field. The more water in the mix (up to a ratio of about 0.7), the more readily it flows and the easier it is to discharge from a mixer truck, move into position in the forms, flow around reinforcing bars, and to finish.

On the other hand, in order to maximize the quality and strength of regular concrete it is desirable to avoid using a w/c ratio any higher than is necessary for a given application. To this end a class of chemical admixtures known as water reducers have been developed that allow for a reduction of the w/c ratio to the low 0.50's or even the high 0.40's while maintaining workability.

By contrast, pervious concrete is more like a jar of marbles in that the aggregate particles are packed together closely, and every particle of aggregate makes contact with several other particles of aggregate. There needs to be enough cement paste coating each aggregate particle to bond the aggregate particles to each other where they make contact, and to lock them securely in place, but not so much paste that the spaces between the aggregate particles are entirely filled up. A high level of aggregate to aggregate contact (consolidation) is directly related to the strength of a pervious concrete slab, because it allows for the transfer of loading forces throughout the slab and into the base material. Additionally, pervious concrete tends to be formed from coarse aggregate(s), with little to no fine aggregates in the mix.

Unlike regular concrete, the cement paste viscosity of pervious concrete needs to be high (thick) enough to allow it to cling to the aggregate, but not easily flow, which would cause it to run off the particles of aggregate, e.g., under the force of gravity or from agitation during installation. Such a run off, or drain down, if it occurred, would greatly reduce the bonds between the aggregate, and the accumulation of cement paste in the lower part of the slab would greatly reduce if not eliminate permeability of the overall slab.

As the cement paste in pervious concrete needs to be thick enough to cling to the aggregate and not to flow off, or drain down, in order to achieve that level of cohesion the w/c ratio in pervious concrete needs to be in a relatively narrow range, typically between 0.28-0.32. Above that range, the cement paste becomes too thin and drains off the aggregate. It should be noted that mixes utilizing a w/c ratio as high as 0.40 have been used by incorporating high dosages of viscosity modifiers admixtures (VMA's). VMA's, however, impart considerable stickiness to the cement paste and actually reduce workability to below acceptable levels. Below that range, the cement mixture is not workable and does not form proper bonds between the particles of aggregate. Unfortunately, the typical w/c range is not only well below that required for full hydration, ~0.41-43, meaning that, in pervious concrete full hydration is not achieved, but the low w/c range is directly responsible for the single most challenging aspect of working with pervious concrete, lack of workability, as well as most pervious concrete failures subsequent to installation.

Pervious concrete is well known for being a thick, relatively dry, stiff product that is difficult to work with and presents challenges at every step of the installation process: batching, transport, placement, finish, and curing. Pervious concrete tends to stick to the inside of the truck drum (as well as to the installation equipment), thereby causing it to discharge slowly from the truck and slide slowly, if at all, down the delivery chute. For this reason, pervious concrete often requires manual assistance, for example in the form of one or two men with shovels, to coax it down the delivery chute. The lack of workability then extends to both the installation and finishing phases where the low w/c pervious concrete requires a considerable degree of effort to move into place, consolidate (compact) and finish.

During installation, PC must be compacted in order to consolidate the aggregate, and create the aggregate to aggregate contact that is critical to load bearing properties. The lower the w/c ratio, the thicker the paste and the more it resists movement during this phase of installation. The increased resistance to flow from the relatively dry, stiff, cement coating on the aggregate increases the amount of compactive effort required during installation, thereby decreasing the degree of consolidation and reducing the critical amount of aggregate to aggregate contact required for strength of the pervious concrete.

The low w/c ratio of PC is also responsible for the next common challenge in working pervious concrete: critical evaporative loss of moisture from the mix during transport and installation.

Because the relatively thin layer of paste coating the aggregates is exposed to the air throughout the entire volume (by contrast with regular concrete where it is only exposed at the exterior surfaces), large amounts of moisture will be lost due to evaporation. From the moment the ready mix truck leaves the batch plant until the plastic curing cover goes on the slab (thereby sealing in the remaining moisture), moisture is being lost due to evaporation. The quantity of moisture loss is sensitive to environmental conditions (temperature, relative humidity, wind speed, sun exposure), and time. The more time it takes to discharge the pervious concrete from the truck, move it into place, consolidate and finish it, the higher the moisture loss will be. Every additional minute needed to discharge and install pervious concrete increases the quantity of water lost to evaporation (thereby lowering the w/c ratio), and subsequently increases the risk of slab failure due to the insufficient hydration that results from such a loss of moisture.

Therefore, typical PC, which starts with a w/c ratio that is already lower than needed for full hydration, and then suffers a further loss of moisture due to the long installation times that result from the thick heavy mix, often gives rise to a weak slab. An insufficiently hydrated PC slab is likely to experience raveling (the contiguous dislodging of aggregate at the surface of the slab) and a compromised in-service performance. For example, from visual observation it is possible to see an average loss of 4-6% w/c ratio during transport and installation. In all but the most ideal conditions, a PC mix designed and batched at the high end of the common range, 0.32 w/c, will actually be a 0.26-0.28 w/c mix by the time the installation is complete; such a reduction in w/c ratio can result in compromised strength and durability of the installed product. Such compromised strength is common in the field.

In sum, in conventional pervious concrete, it is preferred to maintain the w/c ratio at 0.28-0.32. This is to be contrasted with regular concrete, in which the ratio is normally well above 0.5.

Various additives have been utilized to improve workability of PC mixes and durability of the resulting installation. Given the effectiveness of water reducers (WR) to increase workability of regular concrete, it was assumed that they might confer similar benefits on PC. While water reducers do act to thin the paste as one would expect, thinning the paste in PC is not a desirable characteristic for reasons previously stated. To counteract thinning produced by water reducers, a viscosity modifying admixture (VMA) has commonly been used in conjunction with a water reducer. VMA's act to increase the viscosity, or thicken the paste, and are effective in this capacity in a PC mix when used with a water reducer. However, any improvement in workability offered by the water reducer is then offset by the VMA. While the VMA's are effective at offsetting the thinning effects of the WR, they also impart an increased level of stickiness to the pervious concrete mix. PC mixes containing VMA's have proved to be difficult to place and finish because the paste covered aggregate would stick to the truck drum, the discharge chute, the roller, and finishing tools. Making matters worse, water reducers typically have a very limited working life and lose effectiveness after only 30-60 minutes, thereby increasing the thickening and stickiness of the mix. Creating an acceptable finish under these conditions has therefore proven difficult, unless the installation crew applies a release agent liberally and often to the tools and equipment. Since release agents are typically hydrocarbon based, and are strictly regulated in many jurisdictions (and in some instances are not permitted at all), they rarely offset the challenges of installation. In spite of these difficulties, the combination of water reducers, VMA's, and release agents have become common, and equipment manufacturers are now marketing tools specially adapted to work with these types of mixes. By way of example, a finishing cross roller (from Lura Enterprises, West Fargo, N. Dak.) has a built-in brush to remove stuck aggregate from the roller as it turns: (see www.lurascreed.com/previous; scroll down to cross roller with the orange brush).

Another approach to improve workability of PC mixes and durability of the resulting installation is to use a superabsorbent polymer (SAP). SAP's are currently found in personal disposable hygiene products, such as baby diapers and adult protective underwear. SAP's are also commonly used in commercial applications such as for blocking water penetration in underground power or communications cables, as horticultural water retention agents, in control of spill and waste aqueous fluid, and in artificial snow for motion picture and theatrical productions.

In applications of SAP's to pervious concrete, however, studies have focused on improving the internal curing of the concrete in order to obviate use of a plastic curing sheet.

U.S. Patent App. Pub. No. 2010-0285224 describes use of a polypromancic acid based super-absorbent polymer to promote internal curing in order to eliminate a step of coating an area of pervious concrete with a sheet of plastic while curing. The quantities of SAP involved are high (expressed as wt. % of cement), however, in the demonstrated examples: 8-10% by weight (based on a mixture of water, glycogen, slag and the SAP). Additionally, the SAP is accompanied by a dispersant (ground granulated blast furnace slag, amorphous silica and crystalline silica, or Hydromax). Furthermore, there has been little evidence of uptake by the industry (see, for example, the American Society of Civil Engineers (ASCE) manual on Permeable Pavements, 2015, Ed. B. Eisenberg et al., at pages 88-89, which is silent as to such compositions).

Kevern also describes use of a polypromancic acid based SAP to promote internal curing of a pervious concrete (see "Reducing Curing Requirements for Pervious Concrete with a Superabsorbent Polymer for Internal Curing", Kevern, J. T., and Farney, C., *Transportation Research Record: Journal of the Transportation Research Board*, No. 2290, Transportation Research Board of the National Academies, Washington, D.C., 2012, pp. 115-121). The proportion of the SAP described by Kevern is 0.375% by weight (1.5-1.8 lbs per cubic yard) but there has also been little evidence of uptake by the industry.

SAPs have also been used to address internal curing and shrinkage in regular concrete, particularly high strength concrete. (See "Application of Superabsorbent Polymers (SAP) in Concrete Construction", V. Mechtcherine, and H.-W. Reinhardt. Eds., Springer, 2011, at pages 88, 92, and 114.) The lowest reported proportions of the SAP (in that case, acrylic acid-co-acrylamide) are 0.3 wt. %, and the range extends to 0.6 wt. %.

Accordingly, there is a need for a method of improving a PC composition to make it more easily workable without sacrificing quality of the finished product.

The discussion of the background herein is included to explain the context of the technology. This is not to be taken as an admission that any of the material referred to was published, known, or part of the common general knowledge as at the priority date of any of the claims found appended hereto.

Throughout the description and claims of the instant application the word "comprise" and variations thereof, such as "comprising" and "comprises", is not intended to exclude other additives, components, integers or steps.

SUMMARY

The instant disclosure addresses a pervious concrete composition having a SAP component in concentrations not previously seen in the art. The compositions described herein offer advantages over those in the art.

In particular, the disclosure comprises a cross-linked sodium polyacrylate-acrylamide/acrylic acid copolymer based SAP specifically formulated and incorporated into a pervious concrete mix to increase the water/cement ratio in the final installed composition to a range not achievable by current methods in the art. There are associated increases in performance and other benefits.

The disclosure further includes a composition, comprising: cement; optional cementitious materials selected from: fly ash, slag, and silica fume; coarse aggregate such as ASTM C33#4 stone to ½"; water; and cross-linked sodium polyacrylate, wherein the water:cement ratio is in the range 0.35-0.50 by weight, and more particularly is in the range 0.41-0.42 by weight. The cross-linked sodium polyacrylate can be present in an amount of 0.03-0.125%, and in particular 0.055% by weight of cement.

The disclosure also includes a method of installing pervious concrete in an area, the method comprising: forming a uniform mixture comprising a composition as described herein; applying the uniform mixture to the area; and permitting the mixture to set, thereby forming a pervious concrete installation in the area. The pervious concrete composition can contain cross-linked sodium polyacrylate in a dosage of 0.025-0.075% by weight of cement.

The disclosure additionally includes a method of installing an area of pervious concrete, the method comprising: forming a uniform mixture comprising a composition as described herein; dispersing a quantity of cross-linked sodium polyacrylate into the uniform mixture at a rate of 2.5 oz-12 oz/cubic yard; applying the uniform mixture to the area; and permitting the mixture to set, thereby forming a pervious concrete installation in the area.

The disclosure still further includes a composition, comprising: cement; coarse aggregate; water; and a superabsorbent polymer wherein the superabsorbent polymer is not Hydromax and is not cross-linked polypromancic acid, wherein the water:cement ratio is in the range 0.35-0.50 by weight.

The disclosure yet further includes a pervious concrete composition comprising a super-absorbent polymer, present in the range 0.025-0.125 wt. % of cement, and having a water:cement ratio of 0.35-0.50. The super-absorbent polymer in such a composition is crosslinked sodium polyacrylate.

The disclosure also includes a pervious concrete composition having a super-absorbent polymer, wherein the super-absorbent polymer is not Hydromax and is not cross-linked polypromancic acid.

The disclosure also includes a pervious concrete composition comprising cross-linked sodium polyacrylate in the range 0.025-0.125% by weight of cement.

DETAILED DESCRIPTION

Figure 1:
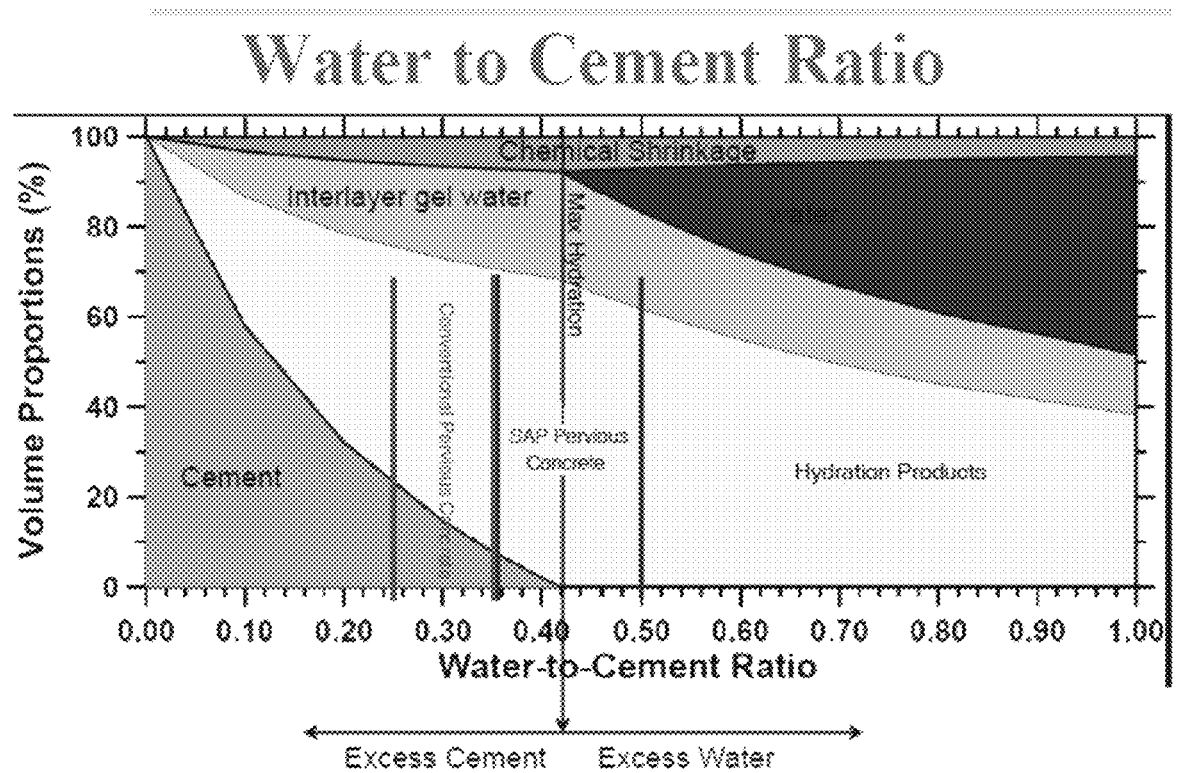
FIG. 1 is a graph showing the proportions of various phases of concrete, according to w/c ratio (data from University of Missouri Kansas City); w/c ratio ranges for regular pervious concrete (0.25-0.35), and the pervious concrete of the invention (0.35-0.50) are shown by vertical bars.
Figure 2:
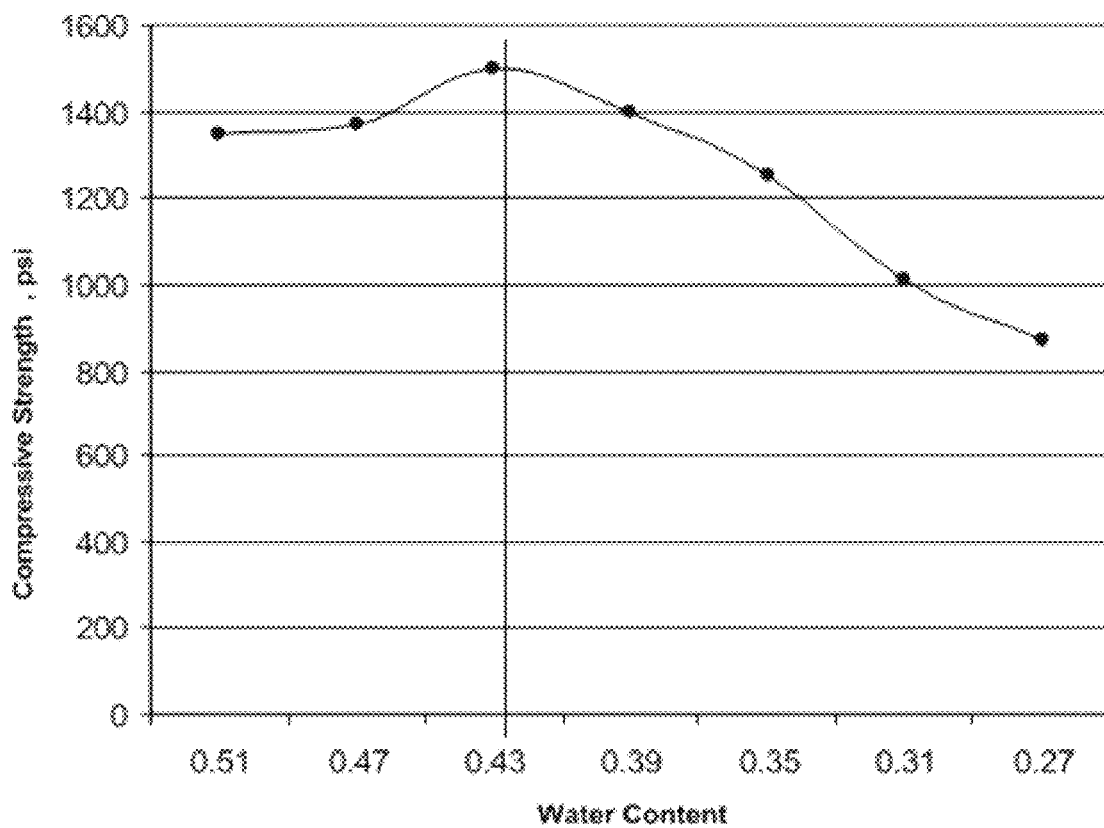
FIG. 2 shows compressive strength after 28 days of curing vs. water content (expressed as a ratio by weight of water to cement in the initial mix). The optimum ratio is shown as 0.43.

The instant technology is directed to a pervious concrete composition, and methods of making and using the same.

The technology includes a way of significantly increasing the w/c ratio of pervious concrete, and therefore its strength, durability and workability, to a range that is otherwise not achievable with current methods or admixtures.

The technology includes the use of a superabsorbent polymer (SAP) introduced into a pervious concrete mixture so that the mixture will absorb a volume of water into the SAP particles, thereby allowing for a significant increase in w/c ratio without decreasing the viscosity of the cement paste in a manner which would otherwise result in paste drain down or runoff. Water is released from the SAP over time, during curing.

Superabsorbent polymers are polymeric materials that can absorb and retain very large amounts of liquid per unit mass. Typically an SAP can absorb at least 50 times its own weight of water, and some SAP's can absorb up to 300 times their weight of water. Water molecules are trapped in a SAP via hydrogen bonding with polar groups on the polymer molecules. One common example, which can be used in the pervious concrete compositions herein, is formed from the polymerization of acrylic acid blended with sodium hydroxide in the presence of an initiator to give a poly-acrylic acid sodium salt. This salt is also referred to as sodium polyacrylate, "sodium polyacrylate, cross-linked", and "acrylic acid polymer, sodium salt". Other examples of SAP's that can be used in the pervious concrete compositions herein include, but are not limited to: potassium co-polymer of acrylic-acrylamide crosslinked, cross-linked acrylate copolymer partially neutralized to the sodium salt, 2-propenoic acid polymer, crosslinked with sodium 2-propenoate, and acrylic acid co-acrylamide. SAP's can be produced using gel, suspension, or solution polymerization methods, as would be within the capability of one skilled in the art.

The SAP is added to the PC mixture in a powdered form, as particles, or in solution. Suitable SAP's are obtainable from the following vendors: Pervious Enhancer Pro, San Carlos, Calif., and True Nutrition, Vista, Calif. 92081 (see, e.g., truenutrition.com/p-7254-hydromax-powder-100-grams.aspx). The SAP particle size is preferably 50-800 μm (micrometers).

Based on the proportion of SAP, an additional volume of water can be added to the cement mix in a manner that does not decrease, or lower, the viscosity of the mix. The addition of SAP allows the cement to retain its body and still cling to the aggregate particles, even with significantly higher w/c ratios than in a typical PC. The increased quantity of water absorbed by the SAP particles allows for mixes not just in the ideal w/c hydration range, but even above that point so that it is possible to compensate for potential moisture loss in transit during hot and or low humidity conditions if desired.

The SAP particles, when swollen with water, also act as a lubricant, yet do not thin the cement and water paste, and therefore provide the significant enhancement in workability of the paste and therefore the pervious concrete mix without the disadvantages associated with VMA, as described above.

A typical formulation is based on 2 oz. to 12 oz. of SAP per cubic yard of pervious concrete mix. Starting from a water/cement mixture, having a 0.35-0.50w/c ratio, SAP is added in the range 0.03-0.125 wt. % of the cement. The SAP absorbs some of the water and traps it in the mixture during transit. The trapped water is then liberated from the SAP as the mixture cures. (The terms set and cure are used interchangeably herein.) Preferred formulations have 3-8 oz. of SAP per cubic yard of pervious concrete mix, and still other formulations have 8-20 oz. of SAP per cubic yard of pervious concrete mix. It is to be understood that other suitable ranges can be inferred by matching lower and upper bounds of the aforementioned ranges. One preferred dosage used is 3.5-4 oz. per cubic yard (0.05 wt. %). The dosages of SAP employed correspond to 0.025-0.125 wt. % of cement (0.1-0.14% wt. of water) in the pervious concrete mix. Acceptable ranges of SAP concentration, including datapoints within, are: 0.03-0.04 wt. %; 0.04-0.045 wt. %; 0.05-0.06 wt. %; 0.055-0.065 wt. %; 0.06-0.07 wt. %; 0.07-0.1 wt. %; 0.1-0.125 wt. %.

Mix Modifications

Pervious concrete is typically designed to have between 15-25% (by volume) voids, the most common target being in the range 17-23%. Once the void space in the aggregate is known, a person skilled in the art of pervious concrete mix formulation can determine the proper volume of cement paste needed to achieve particular design goals. The desired water:cement ratio, in the range of 0.35-0.50 (by weight), is then used to determine the proper quantity of both water and cement. When incorporating an SAP into the mix, the w/c ratio will typically be higher by 0.05-0.15 than a conventional pervious concrete mix that does not have a SAP. So, the preferred range of w/c in the mix will be 0.35-0.50. Other acceptable ranges include: 0.35-0.40; 0.40-0.45; and 0.45-0.50 by weight. Acceptable w/c ratios in the finished product include: 0.35, 0.36, 0.37, 0.38, 0.39, 0.40, 0.41, 0.42, 0.43, 0.44, 0.45, 0.46, 0.47, 0.48, 0.49, and 0.50.

Batching Procedure

In order to make a pervious concrete mix using SAP additives, the following aspects of technique should be considered.

In general, while the SAP can be added to the mix at any time during or after batching, to promote maximum dispersement of the SAP, workers should avoid placing the SAP into the mixing drum before the other components of the concrete mix because doing so may cause the SAP to be trapped in the front of the drum and not fully mix.

In a "dry plant", the other mix components are introduced directly into and mixed in the truck drum. The SAP product may be introduced directly into the truck drum during or after batching but is preferably introduced after batching.

In a central batch or "wet plant", mix components are introduced into a batching drum where they are pre-mixed before being poured into the drum of the truck. The SAP may be introduced into the truck hopper while (but not before) the batch drum is in the process of emptying the pre-mixed pervious concrete into the truck. If this is not possible, the procedure for a "dry plant" should be followed.

When loading less than a full load of pervious concrete, the truck operator should "back up" the pervious concrete mix, moving it towards the back of the drum so that the SAP can be manually placed, or tossed, directly onto the mix.

The SAP may be packaged in a disintegrating bag which can be tossed into the truck unopened, or the SAP can be poured from a bag or container.

When using a volumetric truck, the SAP maybe introduced into the water supply tank in advance of mixing.

The truck drum should be rotated at full speed, 12-15 rpm, for 3-6 minutes after addition of the SAP in order to fully disperse the SAP particles throughout the pervious concrete.

An additional 5 minutes of slow mixing, at 2-5 rpm, which typically takes place during transit to the jobsite, may be needed for full absorption of the SAP into the PC mix. A minimum of 75 revolutions of the drum, in total at full and slow speeds, should be performed.

In the case of a PC mix that includes SAP, a plastic covering may be laid over the pervious concrete after installation, as needed, to promote curing.

No special procedures are required or recommended for discharge of the PC mix from the truck and during installation.

Impacts and Benefits of the Invention

Concrete trucks often accumulate so much PC, which sticks to the inside of the truck and in the fins (due to either the low w/c or use of VMA's), that it has been recommended that a concrete supplier should not use the same truck for more than two consecutive loads of pervious concrete. By being able to use a higher water/cement ratio, afforded by the SAP, this problem is eliminated: the material does not stick and easily comes out of the truck, thereby keeping the trucks cleaner, and requiring less time and effort to maintain them. In addition, the concrete company or supplier is able to put their truck back in service much faster after hauling a PC that has an SAP additive. Many concrete companies have been reluctant to produce PC due to the additional time it takes to unload the material. The sooner the truck returns to the yard the sooner it can be sent out to deliver the next load, which means that operating profit is significantly impacted by truck turnaround times.

The use of SAP in a PC mixture also allows the supplier to compensate for the moisture loss that occurs during transport and installation in warm, dry, or windy weather.

By enabling the mix to have additional water, the flow characteristics of the pervious concrete mix are greatly increased, facilitating an increased discharge rate as well as a more complete discharge. The SAP-added composition slides down the concrete truck delivery chute more easily and more quickly, with little or no assistance of manual labor required; it spreads easily with less effort, and even exhibits the ability to self-consolidate to a degree that is superior to previous compositions in the art, further decreasing the levels of manpower and effort required for installation relative to a PC mix that does not have an SAP additive.

Because of the high water cement ratio, a SAP enhanced mix is much easier to work with than a regular PC mix. It therefore requires less time to install and thereby allows the curing plastic to be applied much sooner. This ensures that adequate levels of moisture remain within the slab for proper curing.

The other common challenge with conventional pervious concrete is the loss of water through evaporation while the mix is in transit to the job site and/or while at the job site during discharge and installation. The water captured in the SAP particles added to a pervious concrete mix as described herein is much less susceptible to evaporation, thereby reducing the overall moisture loss. This has two positive impacts. First, the use of the SAP allows for a mix that is actually above the previously contemplated ideal w/c for a pervious concrete, and thereby compensates for any evaporative moisture loss that does occur. Second, it is typical to have to stop the pour of a conventional pervious concrete mix several times and add additional water to the mix in order to make up for the evaporative moisture loss and in order to maintain the proper moisture level of the paste throughout the application process. When this is necessary, it adds a significant amount of additional time to the installation process (during which time even more evaporative water loss can occur). Time is of the essence during application of the mix; the mix has to be discharged, installed and covered in a short period of time. Continually stopping to add water delays the process unduly. Because of the nature of SAP's and the way they bind water molecules, there is significantly less evaporation loss from a pervious concrete mix that has SAP in it, and the need to add water on the job site is reduced or eliminated.

Overall, then, benefits to the producer include faster discharge and turnaround.

The cleaner drum is a benefit to the producers also. This too has been an issue for producers because drums that have been used to transport pervious concrete mixes (that are drier, and have lower w/c ratios, than regular concrete) require more time, effort and costs to clean the inside of the drums after delivery.

Another benefit of the use of SAPs is a reduced quantity of cement that needs to be used relative to conventional pervious concrete mixes. The increase in w/c ratio, while keeping overall paste volume the same, allows for less cement to be used overall vs. conventional pervious concrete mixes, while increasing strength due to the additional water available for more complete hydration. This allows for both a reduction in cost as well as reduction in the carbon footprint of the finished product.

The use of SAP's eliminates the need for both water reducers and viscosity modifiers, thereby resulting in cost savings from simpler processing, and use of fewer ingredients in the mix.

Another benefit to the producer is an extended delivery range. Once the hydration process starts and the cement starts to set (stiffen), typically 60 minutes after initial batching, a pervious concrete mix is no longer workable so any delay in the onset of hydration is highly desirable. Overall, it has been noted that higher ambient temperatures accelerate hydration and lower temperatures delay hydration. The additional water in the mix due to the SAP keeps the mix cooler and delays the onset of hydration in two ways. First, by reducing friction inside the rotating drum (thus resulting in less heat during transport). Second, the high specific heat capacity of water (relative to that of the other components of the mix) requires considerably more external energy (via higher air temperature) to raise the temperature of the overall mix.

The use of SAP's also makes it possible to save on labor costs due to faster discharge and installation times. Pervious concrete mixtures having added SAP's require less effort to place and finish.

Thus the use of SAP's provides benefits to the installer, due principally to the faster discharge, and faster install that are possible with the pervious concrete compositions of the present invention.

The use of SAP's also gives rise to increased quality in the finished product, arising from greater aggregate consolidation, which is a primary factor in pavement strength. The more aggregate to aggregate contact the stronger the pavement (and this is possible with the higher w/c ratios made possible by the use of SAP's).

The use of SAP's in a pervious concrete mix also makes it possible to install the curing cover sooner than with a conventional mix. This reduces the time the mix is exposed to air, wind, sun, and thereby locks in more moisture for more effective hydration.

Additional benefits to the pavement owner include improved appearance of the slab, increased durability, and an elimination of raveling. The higher level of consolidation and workability with SAP mixes allows for a tighter more consistently smoother appearance, which is more attractive to the customer. Increased durability, i.e., how well the slab holds up over time with continued use, also arises from a pervious concrete that has been formed with SAP's in the mix. Durability is a function of strength, and a pervious concrete mix that has a higher w/c ratio will be stronger.

Pervious concrete is also notorious for raveling, which is the dislodging of stones at the surface. The resulting appearance is quite unattractive and unacceptable to most owners. Another benefit of the mix that uses SAP's is that it eliminates or substantially reduces raveling, because the aggregate is held together more strongly than is the case with a conventional pervious concrete mix.

EXAMPLES

Example 1

Composition #1: Pervious Concrete Incorporating Sodium Poly-Acrylate

The composition of the SAP is 100% poly-acrylic acid sodium salt, also referred to as sodium polyacrylate. CAS Registry No. 09003-04-7.

The ideal dosage range is approx. 0.05% of the weight of cementitious materials, or 3.5-4.5 oz. per cubic yard.

Example 2

Composition #2

The general proportions of basic pervious concrete, when cured, according to the present invention are based on the following formula:
Aggregate: approx. 60%, by volume (typically)
Cement paste
(combination of cement and/optional SCM's and water): approx. 20%, by volume
Air: approx. 20%, by volume
Aggregates can be either river/pea gravel or crushed rock

| Ranges (volume) | typical range | general range (% by volume) |
|---|---|---|
| Aggregates | 57-63 | 55-65 |
| Cement Paste | 17-23 | 15-25 |
| Air | 17-23 | 13-30 |

Performance enhancing additives:
   SAP (by weight) 2.5 oz to 12 oz per cubic yard of concrete.
   Hydration stabilizer (by weight) 2-20 oz per 100 lbs of dry cement as determined by both environmental conditions and transport time from bath plant to job site.
   Fibers may be used in the range of 1.0 to 7.5 lbs per cubic yard. Fibers are used for reinforcement of pervious concrete, since rebar can't be used in pervious concrete.

SCM's are optional cementitious materials such as fly ash, slag, silica fume. These are industrial waste products commonly used in concrete to provide additional benefits such as increased curing and paste density. Their presence does not interfere with the performance of the SAP.

In general, the cement compositions may contain a coarse aggregate and in some cases additionally a small quantity of fine aggregate, typically not to exceed 10% of the total aggregate weight. The coarse aggregate is typically present in the range 50-85% of the total weight of the finished product. The fine aggregate, may be used at 1-10% of the weight of the coarse aggregate.

All references cited herein are incorporated by reference in their entireties.

The foregoing description is intended to illustrate various aspects of the instant technology. It is not intended that the examples presented herein limit the scope of the appended claims. The invention now being fully described, it will be apparent to one of ordinary skill in the art that many changes and modifications can be made thereto without departing from the spirit or scope of the appended claims.

What is claimed:

1. A pervious concrete composition comprising cross-linked sodium polyacrylate, present in the range 0.025-0.125 wt. % of cement, and having a water:cement ratio of 0.35-0.50 by weight.

2. The pervious concrete composition of claim 1, having a water :cement ratio of 0.46-0.50 by weight.

3. A pervious concrete composition comprising cross-linked sodium polyacrylate in the range 3.5-4.5 oz per cubic yard of the composition.

* * * * *